Jan. 17, 1961   H. W. MERRILL ET AL   2,968,454
ROCKET CONTROL SYSTEM
Filed Oct. 29, 1951   3 Sheets-Sheet 1
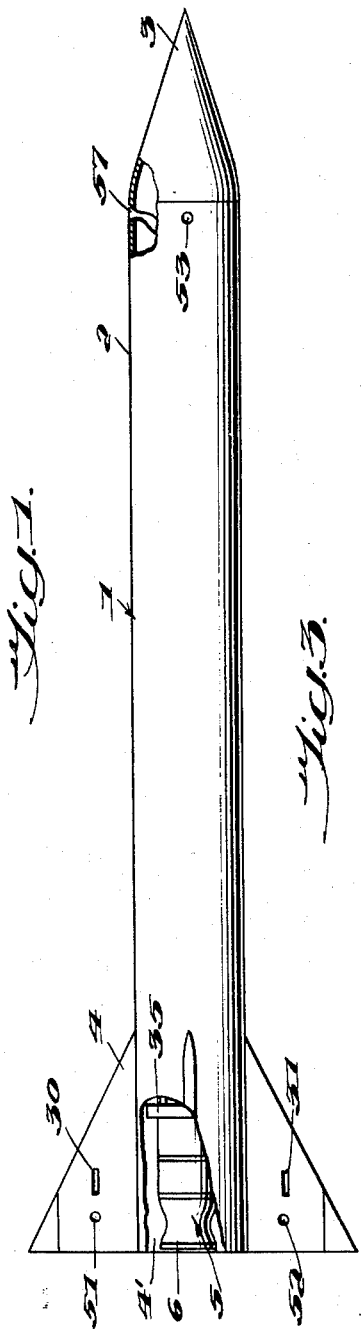
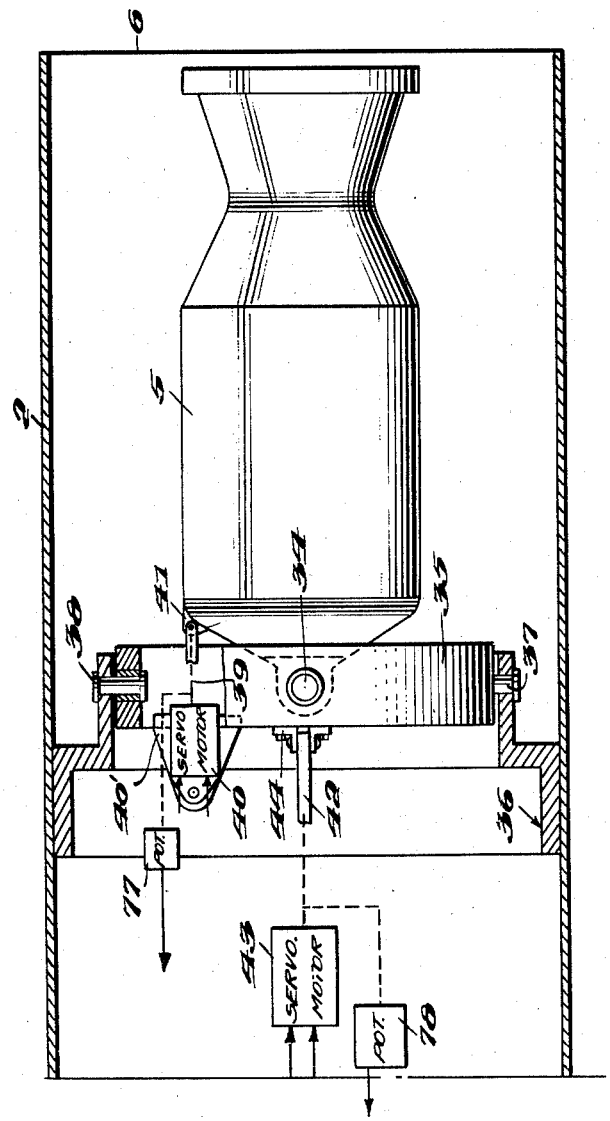
INVENTORS
HOWARD W. MERRILL,
ROBERTSON YOUNGQUIST,
IRWIN R. BARR,
BY
ATTORNEY

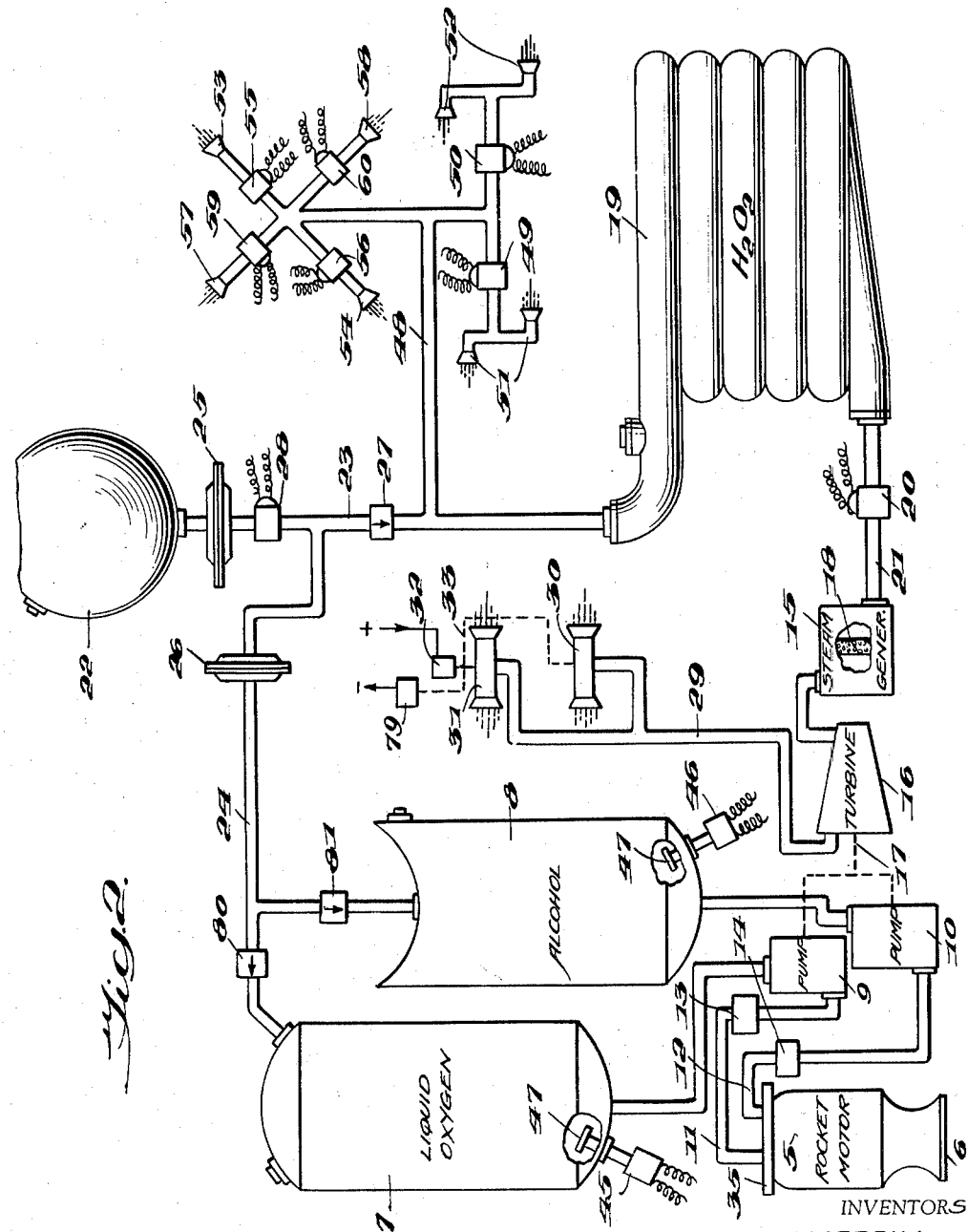

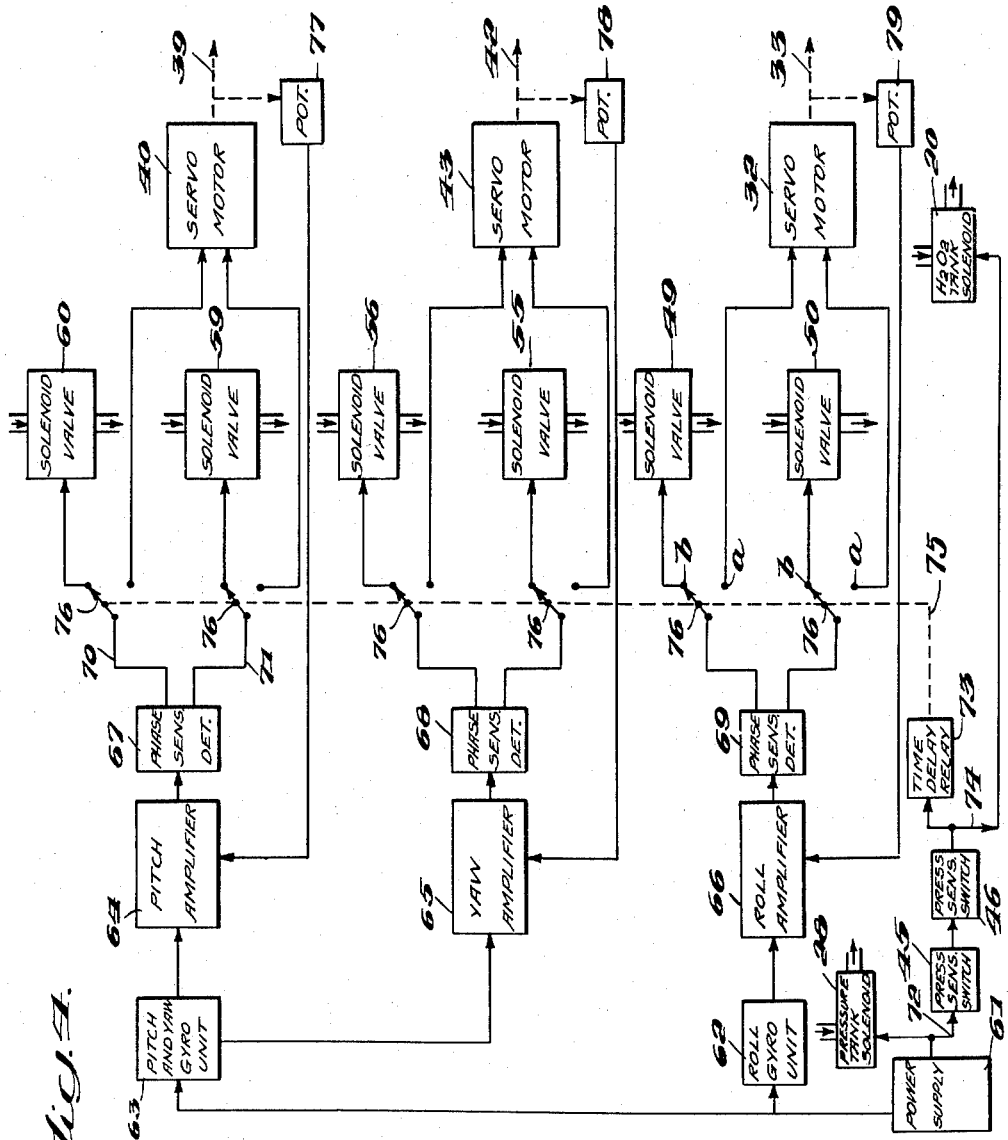

United States Patent Office

2,968,454
Patented Jan. 17, 1961

2,968,454

ROCKET CONTROL SYSTEM

Howard W. Merrill, Towson, Md., Robertson Youngquist, Morristown, N.J., and Irwin R. Barr, Kingsville, Md., assignors to The Martin Company, Middle River, Md., a corporation of Maryland Filed Oct. 29, 1951, Ser. No. 253,658

8 Claims. (Cl. 244—14)

This invention relates in general to rockets and particularly to control means for guiding the same.

Conventional methods of control using movable control surfaces are not practical on high speed, high altitude vehicles such as rockets. At high altitudes the air is so rarified that control surfaces which derive their controlling moments from contact with the airstream, are substantially ineffective. Therefore, other means for guiding such craft must be provided.

An object of this invention is to provide a control system for guiding rockets, which is not dependent upon external air density.

Another object of this invention is to provide an efficient rocket control system which utilizes residual energy from the rocket power plant system.

Still another object of this invention is to provide a control system for guiding rockets which is simple and dependable in operation and which is completely confined within the contours of the rocket.

Further and other objects will become apparent from the accompanying description and drawings which form a part of this disclosure and in which like numerals refer to like parts.

In the drawing:

Figure 1 is a view of a rocket embodying this invention.

Figure 2 is a schematic diagram of the rocket power plant and control system.

Figure 3 is a fragmentary sectional view of the tail portion of the rocket showing the rocket motor mounting.

Figure 4 is a schematic diagram of the rocket's electrical system.

Rocket 1 as shown in Figure 1 includes a long tubular housing 2 having one end closed by a conical nose portion 3. Stabilizing fins 4 are secured to the outer wall of housing 2 adjacent its open end 4' and are arranged thereon 90° apart for stabilizing the rocket in flight. Rocket motor 5 is carried within tubular housing 2 so that its exhaust nozzle 6 is directed toward the open end of the housing to discharge therethrough.

The power plant fuel system shown in Figure 2 is carried within rocket 1 between motor 5 and the conical tip portion 3. Rocket motor 5 produces thrust by burning a propellant mixture of liquid oxygen and alcohol wherein the oxygen serves as the oxidizer and the alcohol as the fuel. The oxidizer and fuel are carried in separate tanks, liquid oxygen tank 7 and alcohol tank 8. Since the propellant mixture must enter the rocket motor under considerable pressure, centrifugal pumps 9 and 10 are employed in the lines 11 and 12 for pumping the propellant from the liquid oxygen and alcohol tanks 7 and 8 into rocket motor 5. Pressure controlled propellant valves 13 and 14 are also carried in lines 11 and 12 between pumps 9 and 10 and motor 5 to control the flow of propellant into the rocket motor. In order to drive pumps 9 and 10 in the power plant system, some additional source of power must be supplied. This is done by generating steam in a steam generator 15 for driving a turbine 16, the output shaft 17 of turbine 16 being connected to the input shafts of each pump 9 and 10. The steam produced in generator 15 is the result of a chemical reaction caused by passing hydrogen peroxide ($H_2O_2$) through a bed 18 consisting of a suitable granular catalyst contained between screen-like barriers. The $H_2O_2$ is carried in tank 19 formed to the shape of a coil for convenience in packaging the equipment within rocket 1. A solenoid control valve 20 in line 21 between the $H_2O_2$ tank 19 and steam generator 15 controls the flow of $H_2O_2$ to the steam generator. A gas filled pressure vessel 22 communicates with $H_2O_2$ tank 19 through line 23 for pressurizing the $H_2O_2$ as required for operation of steam generator 15. The gas in pressure vessel 22 may be nitrogen, helium or the like which does not adversely affect the propellant and $H_2O_2$. Line 24 connecting with line 23 is used to pressurize the oxygen and alcohol tank 7 and 8 to prevent pumps 9 and 10 from cavitating. The pressure supplied from vessel 22 must be maintained at approximately 400 p.s.i. for $H_2O_2$ tank 19 during power plant operation. In order to provide this pressure throughout the required period of time, the pressure within vessel 22 is initially about 5000 p.s.i. To reduce this high pressure in pressure vessel 22 to that required for the $H_2O_2$ tank 19 and oxygen and alcohol tanks 7 and 8, pressure regulators 25 and 26 are carried in lines 23 and 24 respectively. Pressure regulator 25 in line 23 reduces the pressure to approximately 400 p.s.i. for the $H_2O_2$ tank and regulator 26 in line 24 further reduces the pressure for propellant tanks 7 and 8 which are pressurized only sufficiently to prevent pump cavitation. To prevent reverse flow of propellant and $H_2O_2$ into lines 23, and 24, due to rapid deceleration of the rocket, one-way valves 27, 80 and 81 are employed in the input lines to tanks 7, 8 and 19. To control pressurization of the entire system, a solenoid control valve 28 is carried in line 23 adjacent pressure regulator 25.

The residual energy in the steam after being passed through turbine 16 during power plant operation is passed through exhaust steam line 29 to a pair of steam jets 30 and 31 opening into the airstream on either side of opposed fins 4 shown in Figure 1. This exhaust steam is used to control the rocket in roll by directing the steam differentially through one end or the other of each of the steam jets by means of valves (inside the steam jets) positioned by a servo motor 32 through shaft 33. Operation of these steam jet valves is such as to produce a couple about the rocket centerline having a resultant force tending to correct rocket roll errors.

Pitch and yaw control of rocket 1 during power plant operation is accomplished as shown in Figure 3 by pivoting rocket motor 5 so that its thrust line will be angularly displaced from the rocket centerline for producing a component of the reaction force tending to correct the flight heading error of the rocket. Rocket motor 5 is pivoted at 34 to a ring member 35 which, in turn, is pivotally connected to a mounting ring 36 by pins 37 and 38. Bracket 36 is rigidly secured to rocket housing 2. The axis defined by pivots 37 and 38 is perpendicular to that defined by pivots 34 so as to allow universal movement of rocket motor 5. The pivotal movement of motor 5 about pivots 34 is controlled by a suitable link 39 pivoted as at 41 to the rocket motor 5 and adapted to be actuated by a suitable servo motor 40 pivotally secured to ring member 35 such as by support 40'. The pivoting movement due to the swinging of ring 35 about pins 37 and 38 is controlled through a second mechanical arrangement shown schematically as shaft 42 from servo motor 43. Shaft 42 pivotally connects with a bracket 44 carried by ring member 35.

A pair of pressure sensitive switches 45 and 46 are carried by liquid oxygen tank 7 and alcohol tank 8 respectively for sensing a low fuel level condition in its particular tank. As shown in Figure 2, a pressure sensing element 47 from each pressure sensitive switch 45 or 46 projects into the lower end of the tank. This element is thus adapted for sensing the dynamic pressure of the liquid fuel resulting from acceleration of the rocket, and for actuating the switching mechanism used in the electrical circuit described later on in connection with Figure 4 when the dynamic pressure of the liquid reaches a predetermined minimum value.

When either of the pressure sensitive switches 45 or 46 opens due to a low fuel level condition, the power plant is caused to stop operating. This occurrence, referred to as cut-off, destroys the control forces made available during power plant operation. Since the rocket, at cut-off, has attained sufficient speed so as to coast a considerable distance, actually a major portion of the flight, additional control forces must be provided for guiding the post cut-off flight period. This control after cut-off is accomplished by utilizing the residual gas pressure left over from power plant operation in pressure vessel 22 and $H_2O_2$ tank 19. Since the $H_2O_2$ must be maintained under approximately 400 pounds pressure (p.s.i.) throughout operation of the power plant, there is considerable energy left in the system at cut-off for guiding the rocket during the remainder of the flight. The residual energy in the pressurized gas may be readily employed to provide the after cut-off control by selectively discharging such gas through appropriately positioned gas jet openings. As shown in Figure 2, line 48 communicates with line 23 between one-way valve 27 and $H_2O_2$ tank 19 to provide a passage for the residual gas through roll control solenoid valves 49 and 50 and thence through roll control jets 51 and 52. These gas jets are adapted to produce reaction forces tending to restore the rocket to its correct roll position whenever an error signal is received at the control solenoids 49 and 50. Roll control jets 51 and 52, as shown in Figure 1 are mounted in an opposed pair of the tail fins 4 adjacent steam jets 30 and 31 and spaced from the rocket center line so as to produce a large rolling moment about the rocket center of gravity. As shown schematically in Figure 2, the gas jets always produce a balanced couple as do the steam jets 30 and 31, to eliminate otherwise unbalanced forces which would affect pitch and yaw control of the rocket.

Pitch control of rocket 1 after cut-off is similarly accomplished by use of gas jets 53 and 54 in communication with line 48. Pitch control jets 53 and 54 are controlled by means of solenoid valves 55 and 56 respectively as shown in Figure 2. The pitch control jets are carried in the forward end of rocket 1 adjacent the conical nose portion 3 as shown in Figure 1. Pitch control jet 53 is arranged in the plane of one of the tail fins as shown in Figure 1 and the other pitch control jet 54 is arranged diametrically opposite.

Yaw control of rocket 1 is accomplished by means of yaw control jets 57 and 58. The flow of residual gas through jets 57 and 58 is controlled by solenoid valves 59 and 60 respectively. Yaw control jets 57 and 58 are carried at the forward end of the rocket adjacent conical nose portion 3 and displaced 90° from pitch jets 53 and 54 so as to produce a corrective force in the yaw direction.

The electrical circuit for controlling the pivotal movement of rocket motor 5, operation of steam jets 30 and 31 as well as the roll, pitch and yaw gas jets is shown in Figure 4. Control signal voltages for opening and closing the solenoid valves, operating servo motors etc. in the system are generated in power supply 61. One out-put from power supply 61 is fed to a pair of gyro units, roll gyro 62 and pitch and yaw gyro 63. These gyros are employed to establish reference axes from which the attitude of the rocket may be compared. When the rocket heading varies from a predetermined correct position, an error signal is produced in the particular gyro unit proportional to the magnitude of that error. This error output from the gyro unit, which may be an error in pitch, yaw or roll, is fed into an amplifier such as pitch amplifier 64, yaw amplifier 65 or roll amplifier 66.

An error in one direction in the rocket heading produces an out-put signal from the gyro unit of an opposite phase from that of a heading error in the opposite direction. This error signal of a particular phase is fed through the amplifier and into a phase sensitive detector 67, 68 or 69 depending upon whether the error is in pitch, yaw or roll. There are two out-put leads 70 and 71 from each phase sensitive detector 67, 68 and 69 wherein a signal of one phase is fed through lead 70 and a signal of opposite phase is fed through lead 71 so as to properly control the solenoid valves and servo motors for correcting errors in the rocket flight attitude.

At out-put lead 72 from power supply 61 connects with pressure tank solenoid 28 and in series with pressure sensitive switches 45 and 46. Pressure tank solenoid valve 28 is normally closed and opens when the power supply is turned on to pressurize $H_2O_2$ tank 19 and rocket propellant tanks 7 and 8. Pressure sensitive switches 45 and 46 connecting with out-put 72 from power supply 61 remain in closed position so long as the quantity of propellant in the tanks is maintained above a predetermined low. When the propellant level in one of the tanks 7 or 8 reaches a predetermined low level condition the particular pressure sensitive switch 45 or 46 opens to break the circuit between power supply 61 and a time delay relay 73. Lead 74 which connects pressure sensitive switches 45 and 46 with delay relay 73 also connects with $H_2O_2$ tank solenoid 20. This solenoid is normally in closed position to prevent the flow of fluid into steam generator 15 and is open only when the power supply is on and the circuit through pressure sensitive switches 45 and 46 is complete. When either of the pressure sensitive switches 45 or 46 open to deenergize time delay relay 73, solenoid valve 20 is also deenergized to stop the flow of $H_2O_2$.

The output from time delay switching relay 73 is schematically shown as a mechanical linkage 75 which connects with a plurality of switches 76 located in the roll, pitch and yaw circuits in the electrical system. During power plant operation when delay relay 73 is energized, switches 76 are in position "a" so that the output signals from phase sensitive detectors 67, 68 and 69 are fed to their respective servo motors 40, 43 and 32. An input signal to one of the servo motors of a particular phase will cause movement of its output shaft in one direction and an input signal of an opposite phase will cause movement of the output shaft in an opposite direction so as to effect pivotal movement of the rocket motor 5 for pitch and yaw control and operation of the steam jets 30 and 31 for roll control. Since the rocket must be closely controlled during powered flight, a feed-back voltage generated by a potentiometer 77, 78 or 79 driven by the output of the particular servo motor 40, 43 or 32 is utilized in the system. The output from potentiometer 77, 78 or 79 of each control circuit is fed back into its respective amplifier 64, 65 or 66 and compared with the amplifier input from the gyro units so as to produce an output representing the difference between the two amplifier input signals.

When time delay relay 73 is deenergized at cut-off, by actuation of pressure sensitive switch 45 or 46, due to a low fuel level condition in one of the tanks 7 or 8, its output shaft 75, after a very short time interval, moves switches 76 to position "b" so as to feed the outputs from the phase sensitive detectors 67, 68 and 69 to the gas jet control solenoids 49, 50, 55, 56, 59 and 60. These solenoid valves operate from the fully opened to the fully closed positions when controlling the flow of residual gas from the pressure vessel 22 and $H_2O_2$ tank 19 through their respective gas jets. Proper restoring forces are obtained in the pitch control circuit, for example, by having one output from phase sensitive detector 67 connect with one solenoid valve 60 controlling flow through its gas jet so as to produce a corrective force in one direction of pitch and having the other output 71 of the phase sensitive detector connect with solenoid valve 59 controlling its gas jet producing a corrective force in the opposite pitch direction. Operation of control solenoid valves 49, 50, 55 and 56 in the yaw and roll control circuits is similar to that just described for the pitch control circuit.

Operation of the rocket control system is believed obvious from a reading of the foregoing description. To launch rocket 1, power supply 61 is first energized so as to open pressure tank solenoid valve 28, allowing the gas stored in the pressure vessel 22 under high pressure to flow through pressure regulators 25 and 26 into $H_2O_2$ tank 19 and propellant tanks 7 and 8. Since solenoid valve 20 controlling the output from $H_2O_2$ tank 19 is open when the power supply is on and pressure switches 45 and 46 are closed, the power plant is caused to start operation. The steam produced in generator 15 drives turbine 16 which drives pumps 9 and 10 through its output shaft 17. Pumps 9 and 10 force the liquid oxygen and alcohol through pressure controlled valves 13 and 14 and into rocket motor 5 under high pressure for causing burning of the propellant to power the rocket. Valves 13 and 14 remain in closed position so as to prevent the flow of propellant to the rocket motor until sufficient pressure is obtained by operation of the pumps to insure efficient burning. As the thrust from rocket motor 5 causes the rocket to leave the ground, the exhaust steam line 29 from turbine 16 directs the exhaust steam into control jets 30 and 31 for maintaining the rocket in a predetermined roll position as dictated by roll gyro unit 62 in the electrical circuit shown in Figure 4. Any pitch or yaw errors of rocket 1 during power plant operation are corrected for by shifting the thrust line of rocket motor 5 relative to the rocket centerline through operation of servo motors 40 and 43. When either the liquid oxygen or alcohol has been burned by operation of rocket motor 5 so that its tank 7 or 8 is nearly empty, the pressure sensitive switch 45 or 46 in the nearly empty tank is caused to open. When pressure sensitive switch 45 or 46 opens at cut-off, solenoid valve 20 is deenergized to stop the flow of $H_2O_2$ to the steam generator, thereby stopping power plant operation. The rocket during power plant operation continuously accelerates so that at the end of burning, sufficient speed is attained to allow the rocket to coast for a large portion of the total flight if post cut-off control is provided to maintain the proper heading. Since thrust from the rocket motor will not diminish instantaneously upon stopping the flow of $H_2O_2$ from tank 19, it is necessary to maintain the control circuits connected to the rocket motor and steam jet servos for a short period of time after actuation of one of the pressure sensitive switches 45 or 46. This is accomplished in the time delay relay 73 shown in Figure 4. After this short time delay, the output shaft 75 from relay 73 switches the outputs of the phase sensitive detectors to the gas jet solenoid valves to institute post cut-off control operations. Any errors in the heading of rocket 1 from a predetermined position as indicated by gyro units 62 and 63 in Figure 4 cause the solenoid valves of the proper gas jets to open so as to allow the residual gas to flow therethrough to produce a force tending to restore the rocket to the predetermined flight position. Since the hydrogen peroxide in tank 19 requires pressurization at approximately 400 pounds p.s.i. throughout power plant operation, ample residual pressure in pressure vessel 22 and $H_2O_2$ tank 19 is left over at power plant cut-off to guide the rocket for the remainder of the flight.

The rocket control system, since it derives its control forces through jet reaction, is not dependent upon external air density. Therefore the system will function effectively at high altitudes and high velocities. The rocket control system operates at high efficiency since it does not depend upon aerodynamic control surfaces which project into the airstream or jet stream so as to produce undesirable drag forces. Substantially all the available energy carried in the entire power plant system is beneficially employed in the rocket flight.

It is to be understood that certain changes, alterations, modifications and substitutions can be made without departing from the spirit and scope of the appended claims.

We claim as our invention:

1. A rocket comprising a housing, means for propelling said rocket including a power plant carried within said housing and operable to accelerate the rocket for a predetermined period and to cease operation thereafter, a fuel system for said power plant including gas pressure supply means for pressurizing the fuel for said power plant, a plurality of jet openings formed in said housing and communicating with said gas supply means, normally closed valves interposed between said jet openings and said gas supply means for controlling the flow of gas through said openings, and means automatically rendered operative upon cessation of the operation of said power plant for selectively actuating said valves whereby to tap the residual gas pressure in said supply means and use the same to produce reaction forces for guiding said rocket.

2. A rocket comprising a generally tubular housing, a rocket motor carried within said housing adjacent one end thereof for propelling said rocket, a fuel system for said motor, a pressurizing system including a gas filled pressure vessel carried within said housing for pressurizing said fuel system throughout the operation of said rocket motor, a plurality of openings formed in said housing and communicating with said pressure vessel, a normally closed valve interposed between each said opening and said pressure vessel for controlling the flow of gas therethrough, and means automatically rendered operative upon cessation of the operation of said motor and including a gyro associated with said valves for selectively opening and closing the same whereby to allow gas from said vessel to flow through said openings for guiding said rocket.

3. A rocket comprising a generally tubular housing, a rocket motor pivotally carried within said housing adjacent one end thereof, a fuel tank carried within said housing, means including a gas filled pressure vessel communicating with said tank for forcing fuel therefrom into said rocket motor under pressure, servo means controlling the pivotal movement of said rocket motor for guiding said rocket, said housing having a plurality of gas jet openings formed therein communicating with said pressure vessel, valve means interposed between said pressure vessel and said jets for controlling the flow of gas through said openings, and means including a gyro responsive to rocket heading errors adapted to sequentially operate said servo means and said valve means whereby to guide said rocket.

4. A rocket comprising a generally tubular housing, said housing having a plurality of jet nozzle openings formed therein, a rocket motor pivotally carried within said housing adjacent one end thereof, a fuel system in communication with said rocket motor, pressurizing means associated with said fuel system adapted to force fuel into said rocket motor under high pressure, said pressurizing means communicating with said jet nozzles and supplying gas for passage therethrough to produce reaction forces, servo motor means connecting with said rocket motor controlling its pivotal movement, valve means interposed between said jet nozzles and said pressurizing means for controlling the flow of gas through said openings, control means responsive to rocket heading errors adapted to sequentially operate said servo motor means and said valve means for guiding said rocket, and switch means carried by said fuel system responsive to a low fuel level condition for automatically switching said control means from said servo motor means to said valve means.

5. A rocket comprising a generally tubular housing, said housing having a plurality of jet nozzle openings formed therein, a rocket motor pivotally carried within said housing adjacent one end thereof, a fuel system carried within said rocket and communicating with said motor, pressurizing means including a gas filled pressure vessel associated with said fuel system and adapted to force fuel into said rocket motor under high pressure, said pressure vessel communicating with said jet openings whereby to supply gas for passage therethrough to produce reaction forces for changing the heading of said rocket, servo motor means connecting with said rocket motor controlling its pivotal movement whereby to change the heading of said rocket, valve means interposed between said jet nozzles and said pressure vessel for controlling the flow of gas through said openings, control means responsive to rocket heading errors adapted to sequentially operate said servo motor means and said valve means for guiding said rocket, and switch means carried by said fuel system responsive to a low fuel level condition for automatically switching said control means from said servo motor means to said valve means.

6. A rocket comprising a housing having a plurality of laterally directed jet nozzle openings therein, a rocket motor carried within said housing adjacent one end thereof for propelling said rocket, a fuel system in communication with said rocket motor, pressurizing means including a compressed gas chamber associated with said fuel system and filled with a compressed gas adapted to force fuel into said rocket motor, conduit means connecting said chamber and said jets and including valve means for effecting or interrupting communication between the same and controlling the flow of gas through said jet nozzle openings to control the heading of the rocket, a stable element carried by the rocket and means associated therewith for sensing deviations of the rocket from a predetermined heading, and control means actuable by said sensing means for selectively controlling the opening and closing of the valves associated with the appropriate jet nozzles to return the rocket to the predetermined heading when any deviation occurs.

7. A rocket comprising a housing having a plurality of laterally directed jet nozzle openings therein, a rocket motor carried within said housing adjacent one end thereof for propelling said rocket and operable to accelerate the rocket for a predetermined period and to cease operation thereafter, a fuel system in communication with said rocket motor, pressurizing means including a compressed gas chamber associated with said fuel system and filled with a compressed gas adapted to force fuel into said rocket motor, conduit means connecting said chamber and said jets and including valve means for effecting or interrupting communication between the same and controlling the flow of gas through said jet nozzle openings to control the heading of the rocket, a stable element carried by the rocket and means associated therewith for sensing deviations of the rocket from a predetermined heading, control means actuable by said sensing means for selectively controlling the opening and closing of the valves associated with the appropriate jet nozzles to return the rocket to the predetermined heading when any deviation occurs, and means rendered effective upon cessation of the operation of said rocket motor for initiating operation of said control means whereby to tap the residual gas pressure in said chamber and use the same to produce reaction forces for guiding said rocket during the period after the motor operation has ceased.

8. A rocket comprising a housing having a plurality of laterally directed jet nozzle openings therein, a rocket motor carried within said housing adjacent one end thereof for propelling said rocket and operable to accelerate the rocket for as long as fuel is available for motor operation, a fuel system in communication with said rocket motor, pressurizing means including a compressed gas chamber associated with said fuel system and filled with a compressed gas adapted to force fuel into said rocket motor, conduit means connecting said chamber and said jets and including valve means for effecting or interrupting communication between the same and controlling the flow of gas through said jet nozzle openings to control the heading of the rocket, a stable element carried by the rocket and means associated therewith for sensing deviations of the rocket from a predetermined heading, control means actuable by said sensing means for selectively controlling the opening and closing of the valves associated with the appropriate jet nozzles to return the rocket to the predetermined heading when any deviation occurs, and means rendered effective upon depletion of the fuel supply for initiating operation of said control means whereby to tap the residual gas pressure in said chamber and use the same to produce reaction forces for guiding said rocket during the period after the motor operation has ceased.

References Cited in the file of this patent

UNITED STATES PATENTS

| | | |
|---|---|---|
| 726,796 | Fischhaber | Apr. 28, 1903 |
| 1,133,282 | Helfrich | Mar. 30, 1915 |
| 1,598,107 | Trenor | Aug. 31, 1926 |
| 1,973,545 | Sperry | Sept. 11, 1934 |
| 2,351,750 | Fawkes | June 20, 1944 |